Patented May 19, 1953

2,639,222

UNITED STATES PATENT OFFICE 2,639,222

TREATMENT OF ACID WASTE LIQUORS

Edwin S. Tanski, Chicago, Ill., assignor to Marblehead Lime Company, Chicago, Ill., a corporation of Delaware No Drawing. Application November 22, 1949, Serial No. 128,915

5 Claims. (Cl. 23—200)

The present invention relates to a method for treating acid waste liquors in an efficient manner, and more particularly to the treatment of spent pickle liquors resulting from the cleaning of ferrous metal articles, particularly iron and steel sheets.

The normal process for the removal of loose dirt, rust and oxide scale from carbon steel and alloy steels consists in immersing the article to be cleaned in a sulfuric acid bath. Where high chromium stainless steels and other heat-resistant steels are used, it is common to employ mixtures of sulfuric, hydrochloric, nitric, or hydrofluoric acids for such cleansing purposes. In any case, the pickling acid bath may be reused until the acid concentration thereof falls below a desired minimum. In most instances, the acid bath can be used efficiently until it contains about 5% to 10% iron.

A typical analysis of such a waste pickle liquor follows:

| | |
|---|---|
| Acid value, grams of equivalent $SO_4$ ion per liter | 181.0 |
| $SO_4$ equivalent, lbs. per gal | 1.51 |
| Iron (Fe), lbs. per gal | 0.81 |
| Color | Brown |
| Suspended solids (p. p. m.) | 340 |
| Volatile suspended solids (p. p. m.) | 148 |
| Fixed suspended solids (p. p. m.) | 192 |
| Solids settling in 30 minutes (p. p. m.) | 83 |
| pH | 1.0 |
| Specific gravity | 1.25 |

When the concentration of ferrous sulfate in the bath reaches a predetermined maximum (or when the acid value of the waste pickle liquor, determined as grams of $SO_4$ per liter of solution, reaches a predetermined minimum), the operator commences "killing" the bath by adding no more acid but continuing to use the solution for pickling, increasing the time of the pickling operation until the acid is almost spent, as evidenced by a very slow reaction time.

The disposal of such a spent pickling bath has always posed a serious problem in the operation of such treating plants. The pickle liquor contains too high a percentage of sulfates and sulfites to be discharged into a body of water, since such sulfates and sulfites are noxious to plant and animal life present.

One of the most commonly used methods for neutralizing such pickle liquors consists in treating the liquors with an alkaline neutralizing agent, such as a lime slurry, to precipitate a mixture of calcium sulfate and ferrous hydrate. In addition to lime, dolomitic limestone and magnesia find use in such treatment. However, one serious drawback to the use of such an operation is the fact that large quantities of effluent must be discharged at the same time as the precipitate. The pumping of such slurries containing the precipitated ferrous hydrate and the effluent is difficult and requires pumps of considerable capacity to effectively dispose of the same. The precipitate resulting from the neutralization of the pickle liquor is quite difficult to handle in that it has a more or less gelatinous consistency, thus making filtration of the residue extremely difficult.

With the foregoing in mind, it is an object of the present invention to provide a method for neutralizing spent acid liquors, particularly pickle liquors wherein the filtrate is reused indefinitely.

Another object of the present invention is to provide a method for precipitating iron and sulfur-containing ions from pickle liquors to yield a precipitate which has very substantially improved filtering characteristics.

A further object of the present invention is to provide a method for treating waste pickle liquor resulting in the formation of a filter cake of such a consistency that it may be easily handled.

A still further object of the present invention is to provide a method for preparing a lime slurry for use in more efficiently precipitating the iron content of a waste pickle liquor.

Briefly, the invention comprises a system for treating pickle liquor employing the conventional neutralization with an alkaline neutralizing agent such as lime, resulting in a precipitate of ferrous hydrate and calcium sulfate. In my process, however, I use only a slight excess of lime over that stoichiometrically required to precipitate the iron content of the liquor. The resulting slurry is then partially dewatered to form an effluent containing traces of calcium sulfate and a sludge which has filtering characteristics superior to those ordinarily produced by such precipitation treatment. At least a portion of the effluent recovered by the dewatering step is recycled to a stage where the lime is slaked, and slaking with such a solution has been found to be particularly advantageous in obtaining the easily filtrable iron precipitate. In this manner, the problem of disposing of the effluent is substantially avoided, and the sludge produced has such a consistency that it may be easily handled and is readily filtrable.

An important advantage arising from the use of the effluent as a slaking medium resides in the reduction of the amount of liquid required for slaking. The total volume of milk of lime slurry required when using such a slaking medium is reduced in the neighborhood of 33%.

More particularly, in initiating the treatment of pickle liquor of any acid concentration, the liquor is treated with a slurry of slaked lime containing an excess, preferably from 2% to 10% of lime over that stoichiometrically required to precipitate the iron. If desired, a small amount of calcium sulfate may be added to the water initially used to make up the lime slurry. Calcium sulfate added to the lime effects deflocculation of the calcium hydroxide, thus resulting in a more filtrable precipitate of iron compound coming down in the precipitation stage.

The precipitation of the waste pickle liquor may be carried out in several manners, as by feeding the waste pickle liquor into the lime slurry, or feeding the lime slurry into a batch of waste pickle liquor. In any event, upon complete precipitation of the iron in the reactor vessel, the treated slurry is next at least partially dewatered. The most convenient means for accomplishing the dewatering is to pump the slurry to a rotary vacuum filter, although other dewatering means will suggest themselves to those skilled in the art. The amount of dewatering that should be carried out will depend to a large degree upon the nature of the precipitate, and particularly the amount of iron originally present. As a general average, however, I have found that the dewatering of the slurry should be carried out until the resulting partially dewatered sludge contains from about 45% to 65% by weight moisture in the filter cake. Sludges which contain from 52% to 60% moisture are an especially easily handled material and present no serious problem of disposal.

The presence of calcium sulfate in the filtering stage makes possible more rapid filtration of the slurry, since the calcium sulfate crystals apparently form nuceli about which iron hydroxides will form.

At least a portion of the effluent resulting from the filtering operation is then recycled to the slaking stage. This effluent contains an appreciable amount of dissolved calcium sulfate, due to the excess of calcium originally used in precipitation. If an excess of filtrate is collected, over and above that required for slaking the lime, the excess may be disposed of by using it with water to make up a fresh pickling solution. An excess of this type will normally result when a waste pickle liquor of a low acid value is treated.

A typical analysis of an effluent recycled to the slaking stage appears below:

| | |
|---|---|
| Color | Clear |
| Turbidity (p. p. m.) | 50 |
| Total solids (p. p. m.) | 6800 |
| Total volatile solids (p. p. m.) | 1150 |
| Total fixed solids (p. p. m.) | 5650 |
| Suspended solids (p. p. m.) | 80 |
| Volatile suspended solids (p. p. m.) | 50 |
| Fixed suspended solids (p. p. m.) | 30 |
| pH | 11.2 |
| Iron | Trace |
| Specific gravity | 1.003 |
| Sulfates ($SO_4$) percent | 0.13 |

As previously mentioned, the recycling of the effluent containing calcium sulfate to the slaking stage has several distinct advantages. It obviates the problem of disposing of the effluent by discharging it into streams, sewers or the like. Also, the volume of fresh water required is substantially reduced. More importantly, the presence of calcium sulfate has been found to promote deflocculation of the lime during the preparation of lime slurry, and ultimately to yield a filter cake containing precipitated iron which is much more easy to handle than precipitates produced in normal pickle liquor neutralization processes.

In the initial neutralizing and precipitating step, I have found it advantageous to add the spent acid liquor to the lime slurry, rather than the reverse, since thereby the time of reaction is shortened and the precipitation of the sludge takes place more rapidly.

From the foregoing, it will be apparent that I have herein provided an improved process for the treatment of acid waste liquors, such as pickle liquors. While the discussion has been primarily concerned with the treatment of pickle liquors, it will be appreciated by those skilled in the art that the process herein disclosed will have application to other neutralization procedures involving the disposal of other spent acid baths containing dissolved iron compounds.

It will be understood that modifications and variations may be effected without departing from the scope of the novel concepts of the present invention.

I claim as my invention:

1. The method of treating acid waste liquors containing ferrous ions and sulfate ions which comprises slaking lime to provide a slurry, treating said liquor with said slurry to precipitate iron and to provide calcium sulfate in the resulting liquid phase, removing at least a portion of the liquid phase containing calcium sulfate, and recycling the same to the slaking stage for admixture with said lime.

2. The method of treating an acid waste liquor containing ferrous ions and sulfate ions which comprises slaking lime to produce a slurry containing a slight excess of lime over that stoichiometrically required to precipitate the ferrous ions and provide calcium sulfate in the resulting liquid phase, treating an acid waste liquor with said slurry to precipitate ferrous ions and provide calcium sulfate in the resulting liquid phase; removing at least a portion of said liquid phase containing calcium sulfate, and recycling said removed portion to slake additional quantities of lime with said removed portion.

3. The method of treating pickle liquor which comprises slaking lime and water to provide a slurry containing from 2% to 10% by weight excess of lime over that stoichiometrically required for precipitating the iron from said pickle liquor, treating said liquor with said slurry to precipitate the iron present and to leave a liquid phase containing calcium sulfate, removing at least a portion of said liquid phase, recycling at least part of the liquid phase to the slaking stage, and slaking additional quantities of lime with said liquid phase containing calcium sulfate.

4. The method of treating pickle liquor which comprises slaking lime in water to provide a slurry containing 2% to 10% by weight excess of lime over that stoichiometrically required to precipitate the iron in said liquor, treating said liquor with said slurry to precipitate the iron present and to produce a liquid phase containing calcium sulfate, removing sufficient liquid to leave a sludge containing 45% to 65% water, and recycling at least a portion of the removed water containing dissolved calcium sulfate to the slaking step.

5. The method of treating aqueous acid waste liquors containing dissolved iron compounds, which comprises charging said waste liquors into a slurry of lime and water containing calcium sulfate and an excess of lime over that stoichiometrically required for precipitating the iron from said waste liquors, effecting the precipitation of iron present to form a sludge and a clear liquid phase containing calcium sulfate, slaking lime with at least a portion of said clear liquid phase, and precipitating additional amounts of iron from said liquors with the resulting slurry.

EDWIN S. TANSKI.

References Cited in the file of this patent

UNITED STATES PATENTS

| Number | Name | Date |
|---|---|---|
| 1,505,202 | Judd | Aug. 19, 1924 |
| 2,151,261 | Bartlett | Mar. 21, 1939 |
| 2,433,458 | Kahn et al. | Dec. 30, 1947 |

FOREIGN PATENTS

| Number | Country | Date |
|---|---|---|
| 3,505 of 1913 | Great Britain | Feb. 5, 1914 |

OTHER REFERENCES

Hook—"Ind. and Eng. Chem.," vol. 36, No. 3, pages 274–278 (March 1944).

Hook—"Ind. and Eng. Chem.," vol. 39, pages 131–135 (February 1947).